(12) United States Patent
Fisher et al.

(10) Patent No.: US 8,578,393 B1
(45) Date of Patent: Nov. 5, 2013

(54) LOG MESSAGE COLLECTION EMPLOYING ON-DEMAND LOADING OF MESSAGE TRANSLATION LIBRARIES

(75) Inventors: Paul Fisher, Conroe, TX (US); Eugene Golovinsky, Houston, TX (US); Pavel S Trakhtman, Houston, TX (US)

(73) Assignee: Alert Logic, Inc., Houston, TX (US)

( * ) Notice: Subject to any disclaimer, the term of this patent is extended or adjusted under 35 U.S.C. 154(b) by 1284 days.

(21) Appl. No.: 12/141,209

(22) Filed: Jun. 18, 2008

(51) Int. Cl.
*G06F 9/44* (2006.01)

(52) U.S. Cl.
USPC ............ 719/313; 719/315; 719/318; 719/321; 719/328; 719/329; 718/1; 718/105; 713/1; 713/2; 726/1; 726/22; 726/25; 726/29; 709/200; 709/223; 709/224; 709/244; 709/245

(58) Field of Classification Search
None
See application file for complete search history.

(56) References Cited

U.S. PATENT DOCUMENTS

| | | | | |
|---|---|---|---|---|
| 5,524,253 A * | 6/1996 | Pham et al. | | 709/202 |
| 5,612,898 A * | 3/1997 | Huckins | | 709/224 |
| 5,835,749 A * | 11/1998 | Cobb | | 719/331 |
| 5,892,898 A * | 4/1999 | Fujii et al. | | 714/57 |
| 5,941,996 A * | 8/1999 | Smith et al. | | 714/47.3 |
| 5,974,470 A * | 10/1999 | Hammond | | 719/331 |
| 6,112,304 A * | 8/2000 | Clawson | | 713/156 |
| 6,185,600 B1 * | 2/2001 | Spence et al. | | 709/203 |
| 6,247,128 B1 * | 6/2001 | Fisher et al. | | 713/100 |
| 6,279,001 B1 * | 8/2001 | DeBettencourt et al. | | 1/1 |
| 6,449,618 B1 * | 9/2002 | Blott et al. | | 1/1 |
| 6,463,583 B1 * | 10/2002 | Hammond | | 717/162 |
| 6,473,771 B1 * | 10/2002 | Zimniewicz et al. | | 1/1 |
| 6,550,060 B1 * | 4/2003 | Hammond | | 717/162 |
| 6,718,489 B1 * | 4/2004 | Lee et al. | | 714/43 |
| 6,879,995 B1 * | 4/2005 | Chinta et al. | | 709/204 |
| 6,910,208 B1 * | 6/2005 | Zimniewicz | | 717/174 |
| 7,031,981 B1 * | 4/2006 | DeLuca et al. | | 1/1 |
| 7,155,514 B1 * | 12/2006 | Milford | | 709/225 |
| 7,599,939 B2 | 10/2009 | DeStefano et al. | | |
| 7,827,547 B1 * | 11/2010 | Sutherland et al. | | 717/173 |
| 2002/0065950 A1 * | 5/2002 | Katz et al. | | 709/318 |
| 2002/0078129 A1 * | 6/2002 | French et al. | | 709/201 |
| 2003/0012183 A1 * | 1/2003 | Butler et al. | | 370/352 |
| 2003/0145083 A1 * | 7/2003 | Cush et al. | | 709/224 |
| 2003/0182442 A1 * | 9/2003 | Shorter et al. | | 709/238 |
| 2004/0003326 A1 * | 1/2004 | Lizuka | | 714/45 |
| 2004/0158471 A1 * | 8/2004 | Davis et al. | | 704/277 |
| 2005/0120273 A1 * | 6/2005 | Hudson et al. | | 714/38 |
| 2006/0092861 A1 * | 5/2006 | Corday et al. | | 370/256 |
| 2006/0101034 A1 * | 5/2006 | Murphy et al. | | 707/100 |
| 2006/0136134 A1 * | 6/2006 | Mihara | | 702/9 |
| 2007/0283194 A1 | 12/2007 | Villella et al. | | |
| 2008/0256564 A1 * | 10/2008 | Fathalla | | 719/331 |
| 2009/0158407 A1 * | 6/2009 | Nicodemus et al. | | 726/6 |

* cited by examiner

*Primary Examiner* — Andy Ho
*Assistant Examiner* — Shih-Wei Kraft
(74) *Attorney, Agent, or Firm* — Sprinkle IP Law Group

(57) ABSTRACT

A log message collection system selects a configured host and fetches a log message. The log message collection system examines the fetched message to identify one or more DLLs necessary to translating the log message and determines whether the necessary DLL(s) have been loaded into a cache. If so, the log message is translated. If the DLLs are not in the cache, the log message collection system fetches from the log message host only the DLLs necessary to translate that fetched message. After the message is translated, the log message collection system fetches the next log message, identifies the necessary DLLs for that log message, and fetches the DLLs necessary to translate that message.

11 Claims, 5 Drawing Sheets

LOG MESSAGE COLLECTION EMPLOYING ON-DEMAND LOADING OF MESSAGE TRANSLATION LIBRARIES

FIELD OF THE DISCLOSURE

This disclosure relates generally to the field log message analysis and archiving for regulatory compliance, and specifically to the field of remote collection of log messages from computer system based on MICROSOFT WINDOWS operating system.

BACKGROUND

Computer systems utilized for business system generate messages which audit user access, service errors, and other critical information about the operation of the systems. Many such computer systems run the on the MICROSOFT WINDOWS operating system, which collects log message information into the Windows Event Log on the local file system of each computer system. (MICROSOFT and WINDOWS are trademarks of Redmond, Wash. based Microsoft Corporation.) Log messages in the WINDOWS Event Log are maintained in a binary format that is not documented in the public programming interface, and must first be translated into text using public programming interfaces in order to allow analysis and archiving. The message translation programming interface requires the Dynamic Link Libraries (DLLs) containing translation information and supplied with the generating application to be accessible on the computing system performing the translation.

In order to facilitate analysis and archiving of log messages from individual MICROSOFT WINDOWS operating system based computer systems, the WINDOWS Event Log and the application message translation DLLs must be collected to the collecting system and message translation performed. While the log messages held in the WINDOWS Event Log are accessible via MICROSOFT Remote Procedure Call (MSRPC), remotely accessing the application DLLs involved significant processing time and network bandwidth for each target computing system as they are copied to the collecting system.

As a result, current log message collection systems have significant barriers to scaling remote collection beyond several log message hosts, which limits the effectiveness of log message analysis and archiving for MICROSOFT WINDOWS computing systems in large-scale computing systems. Current approaches for remote log message collection from MICROSOFT WINDOWS operating system based computer systems are available in standalone packages or as part of larger system management software products. However, many of these approaches suffer from scalability limitations to the number of collected computing systems, even with less than 100 log message hosts. A leading stand-alone package is Lasso, which is an open source package made available by LogLogic, Inc. However, the Lasso package has been tested to consume several hours to start collection of only 50 MICROSOFT WINDOWS operating system based computer systems. Testing has revealed that much of this time is spent collecting the entire set of application DLLs available on each host system, before any log message collection can begin. On a network with limited bandwidth or unreliable connectivity between the collection and target computing systems, the time needed to load the DLLs may be longer.

A leading system management product supporting log message collection and analysis is MICROSOFT MOM system management suite. The MICROSOFT MOM System Management product suite includes the ability to remotely collect log messages from several host MICROSOFT WINDOWS computing systems. MICROSOFT has documented that this feature works for a very limited number of target computing systems for much the same reason as the Lasso package. The MICROSOFT MOM System Management may be effective only up to approximately 50 log message hosts.

A common approach involves initializing a cache of known DLLs either automatically or on-demand startup, and then continuing remote event collection and translating the collected log messages using the set of cached DLLs. In general, after startup, a log collection system may begin by selecting a host. Once the host has been selected, the log collection system loads the Dynamic Link Library (DLL) for that host and continues to load the DLLs for that host until all the DLLs for that host have been loaded. There may be thousands of DLLs associated with each host. The log collection system may continue selecting hosts and loading the DLLs associated with each host until all hosts have been selected and all DLLs for each host have been loaded. Once this portion of the log collection process is completed, the log collection systems begin fetching log messages from each of the hosts and translating the log messages received from the hosts. Once all the log messages have been received and translated, the log collection system may wait for the next poll interval.

This approach results in several non-optimal behaviors. A disadvantage is that all known DLLs are maintained in the cache of known DLLs, consuming significant amounts of space on the log message collection system, and ultimately limiting the number of remote WINDOWS hosts that can be supported. Also, after initialization, the DLL cache is not updated, which over time will result in untranslatable events. When new applications are installed on the target WINDOWS hosts, this becomes a significant problem. Collection startup using prior art approaches is delayed waiting for the initialization and/or verification of the DLL cache. With a large number of WINDOWS hosts, or a slow and/or unreliable network this causes a significant startup delay. Initialization of the DLL cache in prior art approaches becomes an expensive network operation on slow and/or unreliable network links, in many cases causing significant issues for other network traffic using these links.

SUMMARY

Embodiments disclosed herein make use of the fact that a majority of log messages recorded on MICROSOFT WINDOWS computing systems are a very small subset of the possible application event identifiers and usually the same core set of application DLLs may be used to perform the log message translation for processing. Rather than collecting all possible application DLLs at startup and maintaining this complete collection, embodiments disclosed herein may load only the application DLLs needed for translation for the log messages processed in an on-demand basis. The result is that only a fraction of the set of application DLLs associated with any log message needs to be copied in order to facilitate remote collection of a log message from MICROSOFT WINDOWS computing systems.

Some embodiments disclosed herein are directed to a method comprising the steps in order of receiving a log message into a log message collection system from a configured host, identifying a Dynamic Link Library (DLL) necessary for the translation of the message, examining a cache to determine if the necessary DLL exists in the cache, if the necessary DLL does not exist in the cache, fetching the necessary DLL from the configured host and translating the message using the necessary DLL that is stored in the cache or that is fetched from the configured host or source. In some embodiments, identifying a DLL necessary for translating the message comprises identifying a program that generated the log message. In some embodiments, identifying a program that generated the log message includes identifying any support packs associated with the program. In some embodiments, identifying a program that generated the log message includes identifying any hot fixes associated with the program. In some embodiments, loading the necessary DLL into the cache includes loading a subset of the DLLs associated with the configured host. In some embodiments, the method includes storing the fetched DLL in the log message collection system cache.

Some embodiments disclosed herein are directed to a log message collection system comprising a storage cache, a memory for storing a set of computer-executable instructions and a processor operable to execute the set of computer-executable instructions to (upon startup) immediately fetch a log message from a log message host, examine the storage cache to determine if a Dynamic Link Library (DLL) necessary to translate the log message exists in the storage cache, if the DLL does not exist in the storage cache, fetch the DLL from the log message host, translate the message from the log message host and store the fetched message in the storage cache. In some embodiments, the log message collection system is further operable to determine the program that generated the log message. In some embodiments, the log message collection system is operable to load a subset of the application DLLs for a log message host upon startup. In some embodiments, the log message collection system is further operable to update the storage cache.

Some embodiments disclosed herein may be directed to a log message collection system having a storage cache, a memory for storing a set of computer-executable instructions and a processor operable to execute the set of computer-executable instructions to receive a log message from a log message host, identify a program that generated the log message and examine the storage cache to determine if a Dynamic Link Library (DLL) necessary to translate the log message exists in the storage cache. If the DLL does not exist in the storage cache, the log message collection system may fetch the DLL from the log message host. The log message collection system may translate the message from the log message host and store the received DLL in the storage cache. In some embodiments, a DLL is associated with a service pack. In some embodiments, a DLL is associated with a hot fix. In some embodiments, the log message collection system is operable to load a subset of the application DLLs for a log message host upon startup. In some embodiments, the log message collection system is further operable to update the storage cache.

Some embodiments disclosed herein may be directed to a system that includes a plurality of hosts and a log message collection system. Each host has an associated set of Dynamic Link Libraries (DLLs) for translating log messages generated by the host. The log message collection system may include a storage cache, a memory for storing a set of computer-executable instructions, and a processor operable to execute the set of computer-executable instructions to receive a log message from a log message host, identify a program that generated the log message, and examine the storage cache to determine if a Dynamic Link Library (DLL) necessary to translate the log message exists in the storage cache. If the DLL does not exist in the storage cache, the log message collection system may fetch the DLL from the log message host and translate the message from the log message host. In some embodiments, the log message collection system may store the received DLL in the storage cache. In some embodiments, the processor is operable to execute the computer-executable instructions to identify a service pack and/or hot fix that generated the log message, examine the storage cache to determine if a DLL associated with the service pack and/or hot fix and necessary to translate the log message exists in the storage cache and if the DLL does not exist in the storage cache, fetch the DLL from the log message host. In some embodiments, the log message collection system is operable to load a subset of the application DLLs for a log message host upon startup. In some embodiments, the log message collection system is further operable to update the storage cache.

Embodiments disclosed herein may offer significant reduction in network bandwidth used for the collection of log messages from MICROSOFT WINDOWS computing systems, as well as a measurable reduction in the time required to start and perform log message collection versus the current state-of-the-art. Prior to the embodiments disclosed herein, more than one thousand (1000) application DLLs had to be copied and maintained on the collecting computer system for each log message host. Embodiments disclosed herein may reduce the number of DLLs. For example, the number of DLLs needed to translate log messages from a typical log message host may be less than fifty (50).

One result is that the same computing system hardware and collection network performing log message collection may be capable of collecting nearly ten (10) times the number of target MICROSOFT WINDOWS computing systems. This may be particularly advantageous on bandwidth limited or unreliable networks. Embodiments disclosed herein make collection possible for systems with limited bandwidth or unreliable connectivity.

These, and other, aspects will be better appreciated and understood when considered in conjunction with the following description and the accompanying drawings. The following description, while indicating various embodiments and numerous specific details thereof, is given by way of illustration and not of limitation. Many substitutions, modifications, additions or rearrangements may be made within the scope of the disclosure, and the disclosure includes all such substitutions, modifications, additions or rearrangements.

BRIEF DESCRIPTION OF THE DRAWINGS

Advantages of the disclosure and embodiments disclosed herein will become apparent to those skilled in the art with the benefit of the following detailed description and upon reference to the accompanying drawings in which.

DETAILED DESCRIPTION

The disclosure and the various features and advantageous details thereof are explained more fully with reference to the non-limiting embodiments that are illustrated in the accompanying drawings and detailed in the following description. Descriptions of well known starting materials, processing techniques, components and equipment are omitted so as not to unnecessarily obscure the disclosure in detail. Skilled artisans should understand, however, that the detailed description and the specific examples, while disclosing preferred embodiments, are given by way of illustration only and not by way of limitation. Various substitutions, modifications, additions or rearrangements within the scope of the underlying inventive concept(s) will become apparent to those skilled in the art after reading this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Before discussing embodiments, it may be helpful to describe a setting in which embodiments may be useful.

Figure 1:
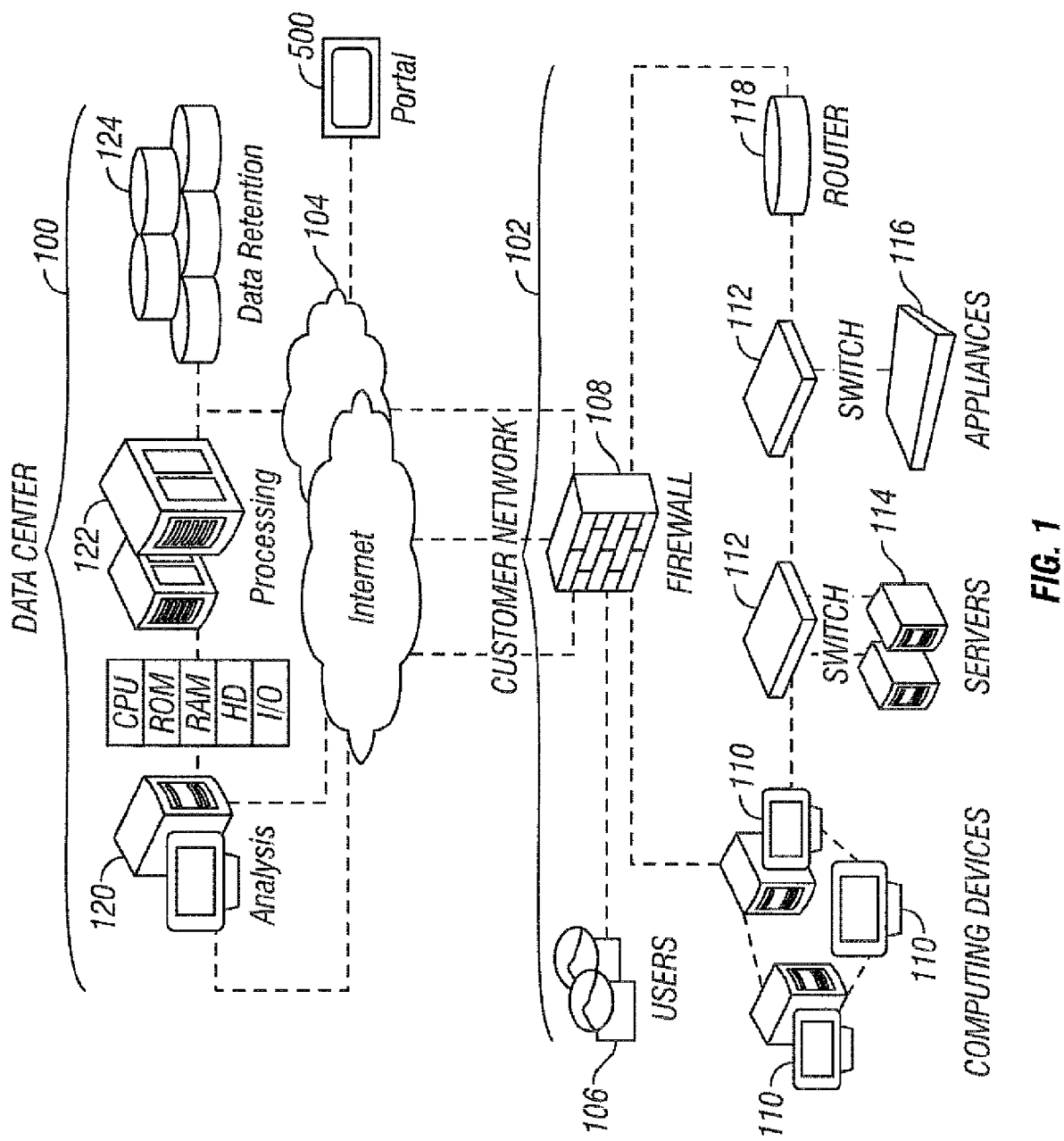
FIG. 1 depicts an architectural diagram of one embodiment of a system for processing log messages using a remote internet infrastructure.

FIG. 1 illustrates one embodiment of a system for processing log messages. Within the system, components including, but not limited to, data center 100, network 102, network 104, users 106, firewall 108, computing devices 110, switches 112, servers 114, appliance 116, and router 118 can cooperate to process log messages. As noted, the system includes appliance 116 and data center 100, each coupled to network 104. Other appliances (not shown) may also be coupled to network 102 or network 104. Network 102 may be an intranet, a private network, a WAN, a LAN, etc. Network 104 may be a public network such as the Internet. Firewall 108 may control access to router 118 and computing devices 110. Appliance 116 may be located on network 102 behind firewall 108. Appliance 116 may communicate with devices such as firewall 108, servers 114, computing devices 110, routers 118, and switches 112 on network 102 to collect log messages generated by users 106 or any of the devices. Computing devices 110 may include laptop computers, personal computers, personal digital assistants, cellular phones, etc.

Appliance 116 may be a desktop computer, a laptop computer, a workstation, or nearly any other device capable of receiving, processing, filtering, packetizing, compressing, encrypting, or sending log messages over network 104 to data center 100. In some embodiments, appliance 116 may be an application residing at one or more of the devices located on network 102. Thus, appliance 116 may be an application running on server 114, may have a portion running on firewall 108 and another portion running on router 118, etc.

In one embodiment, appliance 116 can include a central processing unit ("CPU"), read-only memory ("ROM"), random access memory ("RAM"), a hard drive ("HD"), and input/output devices. Read only memory, random access memory, and hard drive memory of appliance 116 can include media that can be read by the central processing unit and other processors or machines. Therefore, each of these types of memories may include a computer-readable medium. These memories may be internal or external to appliance 116.

Data center 100 may include analysis devices 120, processing devices 122, and data retention devices 124 for receiving, processing, and archiving log messages. Analysis devices 120, processing devices 122, and data retention devices 124 can also have a CPU, ROM, RAM, and HD, either collectively or individually. Data center 100 may include portal 500 for access by users 106 via network 104. Portal 500 may allow users to verify that data center 100 has received log messages, and may also allow users to access the log messages or data associated with the analysis of the log messages.

During operation, users may desire methods for log message processing. In some embodiments, processing may include archiving, compliance processing, systems management, or other reasons. Embodiments may offer log message processing through a Software as a Service (SaaS) delivery platform. Appliance 116 may receive log messages collected from devices such as firewall 108, servers 114, computing devices 110, routers 118, and switches 112 on network 102 using the Syslog, MSRPC, or other protocols. Appliance 116 may filter the messages into transmission priority queues, packetize the messages based on the priority. Appliance 116 may securely transmit the packets to data center 100 for processing in accordance with customer desires, requirements, regulatory compliance, etc.

Figure 2:
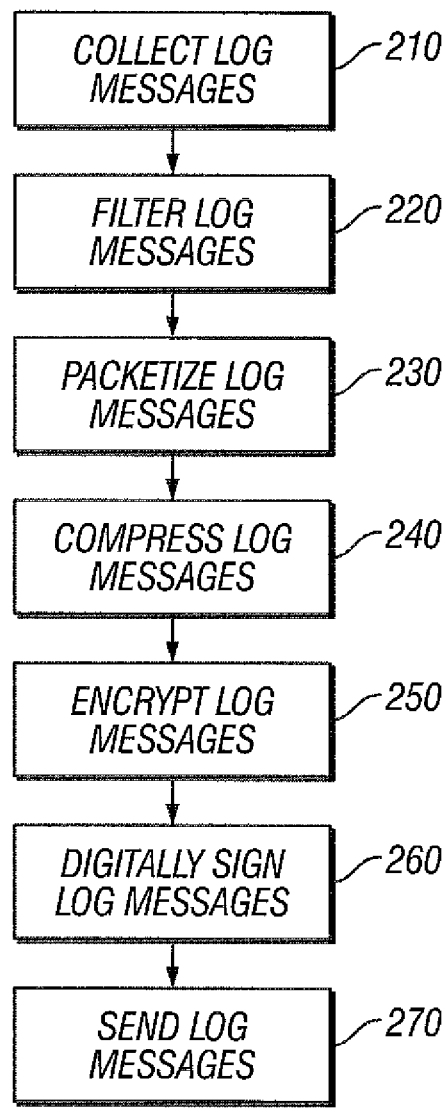
FIG. 2 depicts a flow chart of one embodiment of a method for processing log messages.

FIG. 2 depicts a flow diagram for one method for processing log messages. In step 210, log messages may be collected from computing devices on network 102 and stored in conjunction with appliance 116. In some embodiments, access to MICROSOFT WINDOWS log messages may be provided by remotely accessing the WINDOWS Windows Event Log using the MICROSOFT Remote Procedure Call (MSRPC). In some embodiments, a customer may configure firewall 108, servers 114, computing devices 110, routers 118 and switches 112 to send log messages to appliance 116. Appliance 116 may store a set of computer-executable instructions operable to receive log messages from computing devices 110, servers 114, switches 112, firewall 108, users 106, routers 118, or other devices located on network 102. Log messages may be sent according to the syslog protocol. RFC 3164 describes aspects of the syslog protocol. Those skilled in the art will appreciate that collection may be possible by changing the syslog pointers to direct log messages to appliance 116. Appliance 116 may store collected log messages in a buffer, discussed below.

In step 220, appliance 116 may evaluate a set of specified message content rules to filter the log messages into priority queues or discard messages not designated for retention. In some embodiments, three priority queues may be used, although any number of priority queues may be established by a user. The priority queues may be based on users 106, servers 114, computing devices 110, firewall 108, switches 112 or router 116. For example, a log message generated from a particular server 114 may have a higher priority than another server 114. A log message generated by a selected user 106 may be designated a higher priority than a log message generated by another user 106. A log message generated from outside firewall 108 may have a higher priority rating than a log message generated from inside firewall 108. The priority queues may be prioritized as high, medium or low. The priority queues may have a numerical prioritization such as 1-5. Those skilled in the art will appreciate that other prioritization formats may be utilized. The filtered and prioritized log messages may be stored in queues in appliance 116.

In step 230, appliance 116 may packetize the messages from one or more priority queues. Packetization may be based on the bandwidth of the network 104 available for communicating with data center 100 or the packetization algorithm. The bandwidth policy and packetization algorithm may independently affect the size of the packets, or may interact to affect the size of the packets.

Bandwidth transmission policy may be a set of limits specifying the bandwidth limit appliance 116 is permitted to utilize. The bandwidth limit may be specified as a number of bytes per second or some other criterion. In some embodiments, the set of limits may be composed of non-overlapping time frames, with each time frame having an associated bandwidth limit. In some embodiments, a default bandwidth may be in effect when no bandwidth limit has been specified. Thus, if the available bandwidth is high, the packet size may be larger to accommodate more log messages or more packets may be sent. By packetizing the messages based on the available bandwidth, interference with day-to-day operations of the network or devices on the network may be reduced. In an example, Table 1 depicts a sample bandwidth transmission policy. In Table 1, a first (default) bandwidth limit is set at 1500 Kbps, a second bandwidth limit is set at 200 Kbps between 0600-1800 hours, and a third bandwidth limit is set at 700 Kbps between 1800-2100 hours.

TABLE 1

| Default Rate | 1500 Kbps |
|---|---|
| 0600-1800 hours | 200 Kbps |
| 1800-2100 hours | 700 Kbps |

With the effective bandwidth transmission limit in effect, appliance 116 may follow a packetization algorithm to generate packets of log messages for transport. As log messages arrive at appliance 116, they can be sorted into transmission priority queues based on a prioritization policy, such as in step 320. Appliance 116 may utilize a packetization algorithm to select log messages from the various queues based on the priority of the log message, and fill packets to the configured size limit.

Table 2 depicts one embodiment of a packetization algorithm that may be used by appliance 110 to packetize log messages.

TABLE 2

| 1. Select log messages from the highest priority queue available until: | 1.1 Size limit of packet is reached; 1.2 The queue is exhausted; or 1.3 The next log message is outside of the packet time interval. |
|---|---|
| 2. Select log messages from the next lower queue available for the current interval, until: | 2.1 The size limit of the packet is reached; 2.2 The queue is exhausted; or 2.3 The next log message is outside the packet time interval. |
| 3. Repeat the second step until: | 3.1 The size limit of the packet is reached; or 3.2 All queues have been processed. |

In one embodiment, when appliance 116 selects the highest priority queue, a queue may be skipped if the queue was exhausted, or may be skipped on each subsequent execution until the lowest priority queue is exhausted on the last execution of the algorithm, the queue is skipped for a priority-specific time period or the contents of the queue would fill more than half the contents of the size limits of packets.

Embodiments may also allow a user to designate rules for packetizing. For example, a user may establish criteria such that all high priority log messages are packetized and sent from appliance 116 to data center 100 immediately, regardless of bandwidth. A user may establish criteria such that medium priority log messages are sent only during selected hours, or when the bandwidth is at a selected level. A user may establish criteria such that low priority log messages are sent only during selected hours, only when the bandwidth is at its highest level, or some other criteria. Thus, a user is able to designate criteria that enable embodiments to optimize the transmission of information to ensure higher priority messages are received timely, but without decreasing transmission rates (or increasing bandwidth costs) due to the transmission of lower priority messages. It will be apparent that a wide variety of criteria may be utilized by a user to designate these types of rules.

In step 240, appliance 116 may compress the packets. The compression of the log message data may be performed using the bzip2 algorithm [BZIP2]. In step 250, appliance 116 may encrypt each packet before sending the packet over network 104. The SHA-256 algorithm is one example of an encryption algorithm. In step 260, appliance 116 may digitally sign the encrypted packet before sending the packet over network 104. The FIPS 186-2 digital signature algorithm is one example of a digital signature algorithm. Those skilled in the art will appreciate that other compression, encryption and signature algorithms may be used.

Once constructed, in step 270 packets that have been compressed, encrypted and digitally signed may be transmitted to data centers via encrypted transport over a public network, such as the Internet, and processed. In some embodiments, appliance 116 can communicate with data center 100 to send packets of log messages from network 102 to data center 100 using network 104. Communications between appliance 116 and data center 100 can be accomplished using electronic, optical, radio-frequency, or other signals. For example, when a user accesses appliance 116, appliance 116 may convert the signals to a human understandable form when sending a communication to the user and may convert input from a human to appropriate electronic, optical, radio-frequency, or other signals to be used by data center 100. Similarly, when an operator accesses data center 100, data center devices 120, 122, and 124 may convert the signals to a human understandable form when sending a communication to the operator and may convert input from a human to appropriate electronic, optical, radio-frequency, or other signals to be used by appliance 116.

The transmission of packets may be controlled via the appliance in order to limit the amount of network bandwidth utilized, which allows the customer to manage the impact on their network.

Embodiments may satisfy regulatory compliance processing without the storage volume normally associated with archiving log messages. For example, if log messages are retained in response to a statutory requirement, a digital signature may be used to verify that the compressed and encrypted log messages archived in a remote infrastructure are the same as the original log messages. As a result, a user may satisfy the statutory requirement using a fraction of the storage volume.

Figure 3:
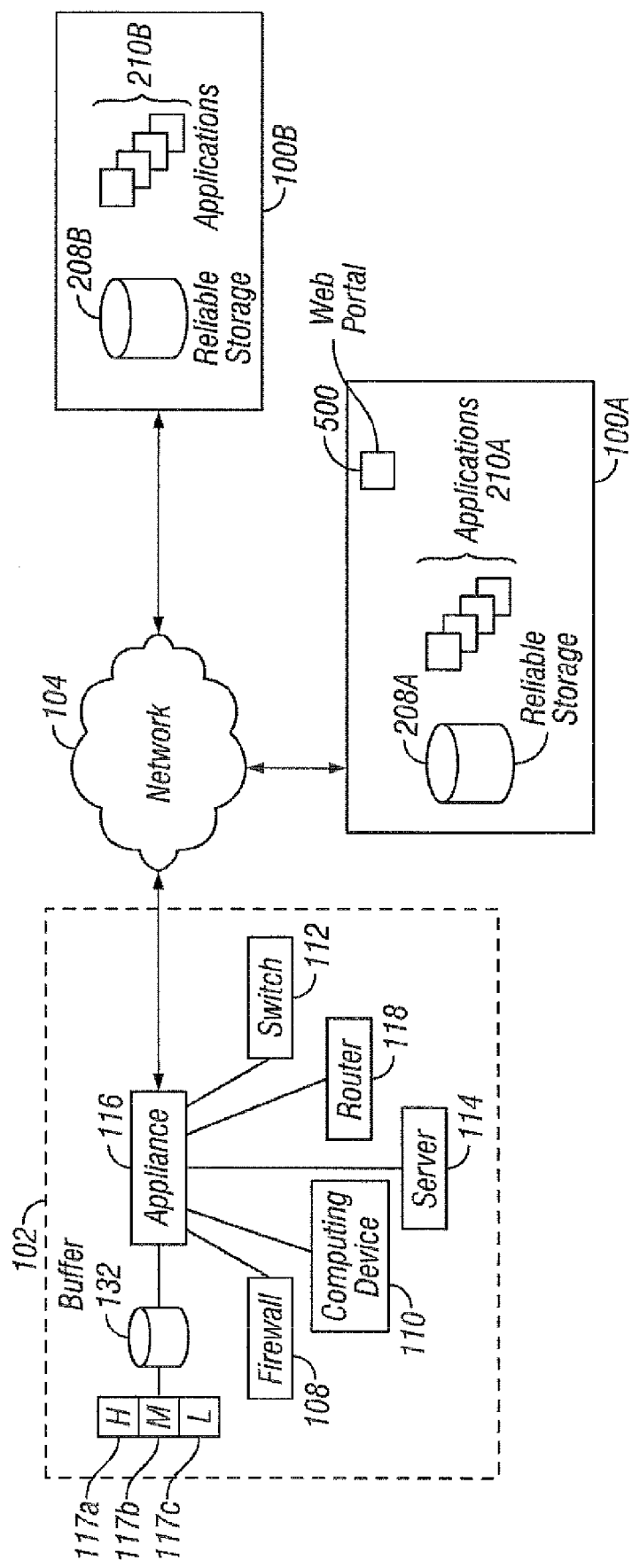
FIG. 3 depicts an architectural diagram of one embodiment of a system for processing log messages.

FIG. 3 depicts an architectural diagram of one embodiment of a system for processing log messages. Appliance 116 on network 102 may communicate with computing devices 110, servers 114, switches 112 and routers 118, each of which may forward log messages to appliance 116. Appliance 116 may filter the log messages and prioritize the log messages received from computing devices 110, servers 114, switches 112, routers 118 and other devices located on network 102 based on user-defined criteria. Examples include, but are not limited to, the type of computing device, the identification (username or password) of a person 106 accessing or attempting to access network 102, the time of day, the program or application the user is using or attempting to use, the length of time the program is being used, and what information is being requested. In some embodiments, appliance 116 may store the filtered log messages in transmission priority queues such as queues 117a, 117b and 117c in buffer 132. Buffer 132 or queues 117a, 117b and 117c may be internal or external to appliance 116. In some embodiments, filtering may be based on a program, address or facility that generated the log message.

Appliance 116 may communicate with first and second data centers 100A, 100B over network 104 to send packets from appliance 116 to first and second data centers 100A, 100B. First and second data centers 100A, 100B may receive packets which have been compressed, encrypted or digitally signed and store the packets in reliable storage 208A, 208B, respectively. First and second data centers 100A, 100B may include applications 210A, 210B that are useful for analyzing log messages in accordance with customer processing desires, requirements, protocols, etc. Applications 210A, 210B may be stored on analysis devices 120 or processing devices 122 (not shown in FIG. 4). First and second data centers 100A, 100B may include applications 210A, 210B, respectively, that may process log message packets to decompress, decrypt, and verify packets and process the data contained in each packet.

Those skilled in the art will appreciate that large networks 102 may have many devices such as firewall 108, servers 114, computing devices 110, routers 118, and switches 112 that can generate enormous volumes of log messages. Loading all the DLLs for each device running a MICROSOFT product may be a lengthy and expensive proposition. Embodiments disclosed herein enable DLLs to be loaded on-demand to reduce the time needed to process the log messages. Reference is now made in detail to the exemplary embodiments, examples of which are illustrated in the accompanying drawings. Wherever possible, the same reference numbers will be used throughout the drawings to refer to the same or like parts (elements).

Figure 4:
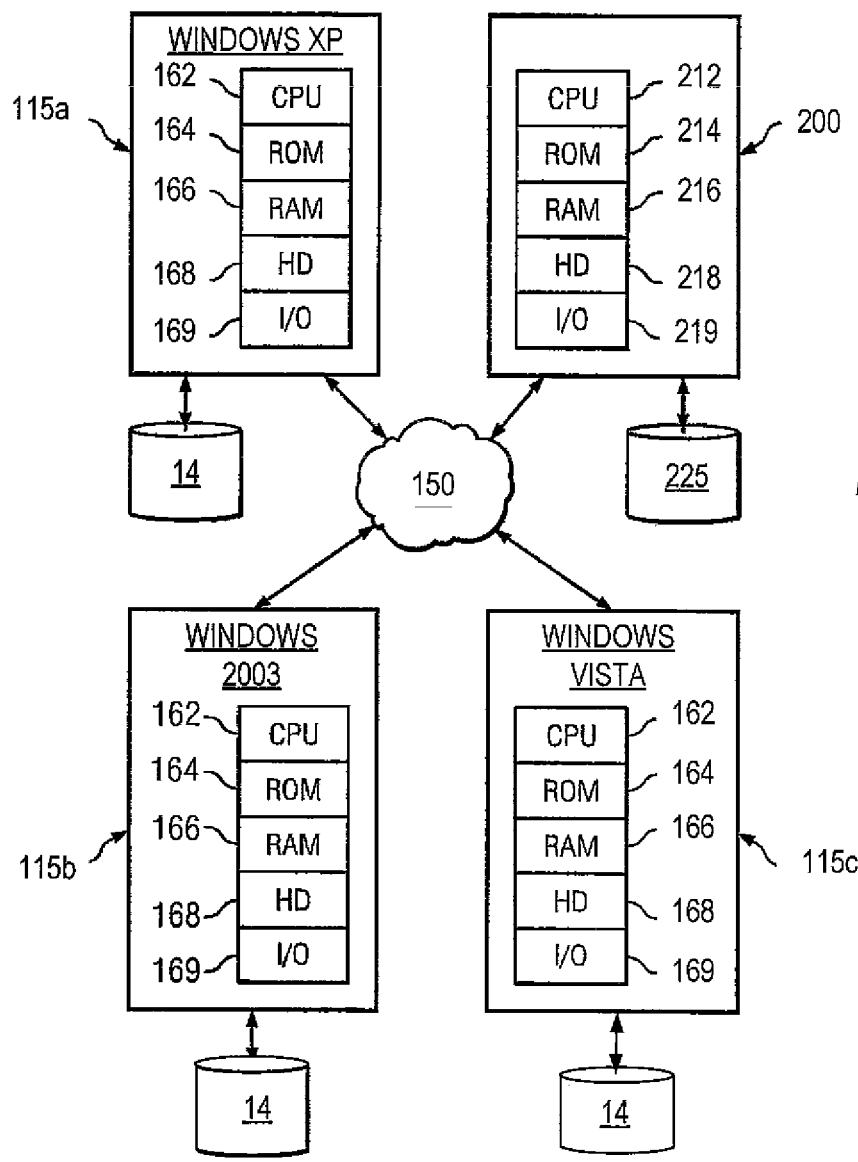
FIG. 4 depicts a block diagram of one embodiment of a system for log message processing.

FIG. 4 depicts an exemplary architecture and includes log message collection system 200 and hosts 115, each bi-directionally coupled to network 102. As used herein, the term coupled generally refers to the ability for log message collection system 200 and hosts 115 to exchange information. The connection may or may not be permanent. The connection may be over a wired or wireless network. In some embodiments, log message collection system 200 may be an application residing on appliance 116.

As depicted in FIG. 4, each host 115 may be a desktop computer, a laptop computer, a work station, or nearly any other device capable of running a WINDOWS program. In some embodiments, hosts 115 may include devices such as computing devices 110 depicted in FIG. 1. Host 115 can comprise central processing unit ("CPU") 162, read-only memory ("ROM") 164, random access memory ("RAM") 166, hard drive ("HD") 168, and input/output device(s) ("I/O") 169. ROM 164, RAM 166, HD 168 and database 14 can include media that can be read by CPU 162. Therefore, each of these types of memories includes a data processing system readable medium. These memories may be internal or external to host 115. Other host computers (not shown) may also be bi-directionally coupled to internal network 150. Host 115 may store a set of Dynamic Link Libraries (DLLs) necessary to translate log messages generated by host 115. A set of DLLs may be associated with each WINDOWS product. For example, there may be a set of DLLs for WINDOWS 2000, WINDOWS 2003, WINDOWS XP, WINDOWS VISTA, and WINDOWS 2008. (WINDOWS, WINDOWS 2000, WINDOWS 2003, WINDOWS XP, WINDOWS VISTA, and WINDOWS 2008 are trademarks of Redmond, Wash. based Corporation.) In FIG. 4, host 115a is depicted as operating WINDOWS XP, host 115b is depicted as operating WINDOWS 2003, and host 115c is depicted as operating WINDOWS VISTA. There may also be a set of DLLs associated with each service pack for each program. For example, WINDOWS XP on host 115a may have two service packs or updates. There may also be a set of DLLs associated with each hot fix for each program. Thus, in a computer system, unless all hosts 115 are running the same program, service pack, and hot fix, each host 115 may have a unique set of DLLs.

Log message collection system 200 can include CPU 212, ROM 214, RAM 216, HD or storage memory 218, and I/O 219. I/O 219 can include a keyboard, monitor, printer, electronic pointing device, or the like. Log message collection system 200 can include storage cache 225. Log message collection system 200 may have more than one CPU, ROM, RAM, HD, I/O, or other hardware components. For simplicity, log message collection system 200 is illustrated as having one of each of the hardware components, even if more than one is used.

Figure 5:
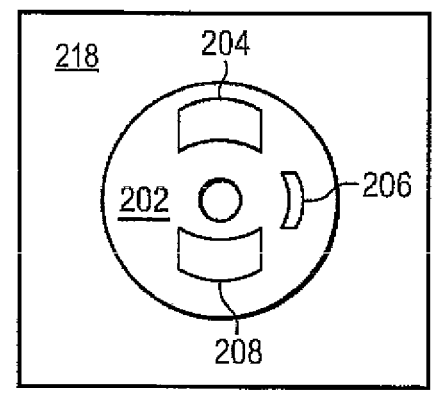
FIG. 5 depicts an illustration of a storage medium including software code having instructions in accordance with one embodiment.

Portions of the methods described herein may be implemented in suitable software code that may reside within ROM 214, RAM 216, or HD 218. The instructions in an embodiment of the present disclosure may be contained on a data storage device, such as HD 218. FIG. 5 illustrates a combination of software code elements 204, 206, and 208 that are embodied within data processing system readable medium 202 on HD 218. Alternatively, the instructions may be stored as software code elements on a DASD array, magnetic tape, floppy diskette, optical storage device, or other appropriate data processing system readable medium or storage device. In an illustrative embodiment of the disclosure, the computer-executable instructions may be lines of compiled $C^{++}$, Java, or other language code.

In the hardware configuration above, the various software components may reside on a single server computer or on any combination of separate server computers. In alternative embodiments, some or all of the software components may reside on the same server computer. For example, the content delivery software component and the page generator software component could reside on the same server computer.

Still referring to FIG. 5, communications between any of the computers in FIG. 5 can be accomplished using electronic, optical, radio-frequency, or other signals. For example, when a user is at host 115, host 115 may convert the signals to a human understandable form when sending a communication to the user and may convert input from a human to appropriate electronic, optical, radio-frequency, or other signals to be used by log message collection system 200. Similarly, when an operator is at log message collection system 200, its server computer may convert the signals to a human understandable form when sending a communication to the operator and may convert input from a human to appropriate electronic, optical, radio-frequency, or other signals to be used by host 115.

Figure 6:
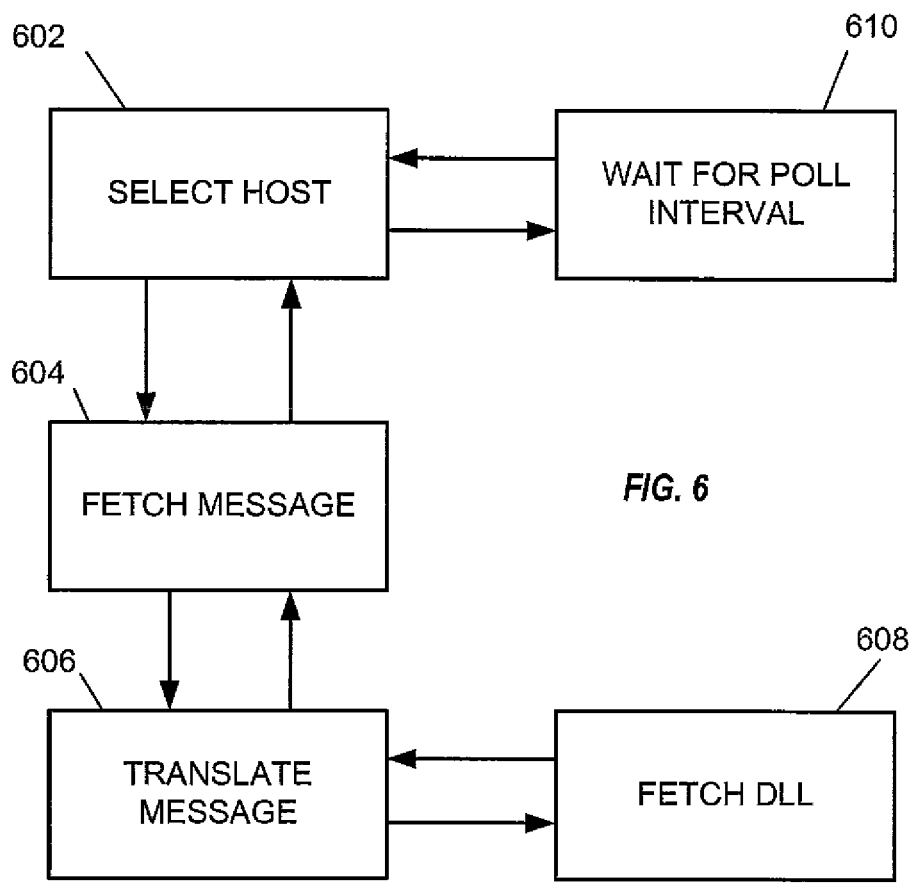
FIG. 6 depicts a block diagram of one embodiment of a system for log message collection.

Embodiments of log message collection system 200 disclosed herein may fetch a DLL necessary to translate a log message once the message has been fetched from the log message host, the DLL desired to translate the DLL has been identified, and log message collection system 200 has determined that the desired DLL has not already been stored in storage cache 225. FIG. 6 depicts a block diagram of the various states log message collection system 200 may transition between during remote collection of log messages. Using this organization, upon startup, collection system 200 may begin in select host state 602. In select host state 602, log message collection system 200 may communicate with host 115 to determine if host 115 has any log messages that should be collected into log message collection system 200.

After host 115 is determined to have one or more log messages for collection, log message collection system 200 may transition to fetch message state 604. In fetch message state 604, log message collection system 200 may communicate with host 115 to fetch or receive a log message from host 115.

After log message collection system 200 fetches a log message from host 115, collection system 200 may transition to translate message state 606.

In translate message state 606, log message collection system 200 may identify a DLL needed to translate the log message received from host 115 from a binary format into text. Once log message collection system 200 identifies a DLL necessary to translate the log message, log message collection system 200 may determine if the DLL has already been loaded into storage cache 225. If so, log message collection system 200 may use the loaded DLL to translate the log message.

If log message collection system 200 attempts to translate a log message from host 115 and does not have a necessary DLL, log message collection system may transition to fetch DLL state 608. In fetch DLL state 608, log message collection system 200 may communicate with host 115 to obtain the DLL necessary to translate the log message. Log message collection system 200 does not need to load all the DLLs from host 115, but only the DLL needed at that time to translate the log message just received from host 115. Once log message collection system 200 has loaded the DLL, log message collection system 200 may transition back to translate message state 606. Thus, if while attempting to translate a log message, a corresponding DLL does not exist in cache 225, then log message collection system 200 transitions directly to fetch DLL state 608 to retrieve just the missing DLL on-demand.

Embodiments disclosed herein may store DLLs fetched from host 115 in cache 225. In this way, once log message collection system 200 loads a DLL from one host 115 for one log message, the DLL may be maintained in log message collection system 200 such that log message collection system 200 does not need to fetch the DLL again for subsequent log messages or for log messages fetched from other hosts 115.

Log message collection system 200 may transition between translate message state 606 and fetch DLL state 608 until the message is translated. Log message collection system 200 may transition between fetch message state 604, translate message state 606 and fetch DLL state 608 until all the messages for host 115 have been fetched and translated. Log message collection system 200 may transition between select host state 602, fetch message state 604, translate message state 604 and fetch DLL state 606 until all the messages for all hosts 115 on the system have been translated. If all messages from all hosts 115 have been fetched and translated, log message collection system 200 may transition to wait for poll interval state 610.

As an example, log message collection system 200 may attempt to translate a first log message from a first host 115a and identify WINDOWS Views XP as the program used to generate the log message. Log message collection system 200 may communicate with host 115 to fetch a first DLL associated with WINDOWS XP and maintained on first host 115 in order to translate the log message. After translating the first log message, log message collection system 200 may store the first DLL in storage cache 225. Log message collection system 200 may fetch a second log message from first host 115a and determine that the first DLL is necessary to translate the second log message. Log message collection system 200 may call the first DLL stored in storage cache 225 to translate the second log message. Log message collection system 200 may fetch a third log message from first host 115a and identify a second DLL necessary to translate the third log message and determine that the second DLL is not loaded in storage cache 225. Log message collection system 200 may communicate with first host 115a to fetch the second DLL necessary to translate the third log message. After translating the third log message, log message collection system 200 may determine there are no more log messages in first host 115a. Log message collection system 200 may communicate with second host 115b and begin receiving log messages from second host 115. Log message collection system 200 may receive a first log message from second host 115b and determine that the log message was generated by WINDOWS 2003 having a service pack installed. Thus, the DLL associated with the first DLL fetched from first host 115a may not translate the first log message received from second host 115b. If not, log message collection system 200 may communicate with second host 115b to fetch the DLL associated with the first log message received from second host 115b. Log message collection system 200 may translate the first log message received from second host 115b and save the associated DLL in storage cache 225. Log message collection system 200 may communicate with second host 115b and receive a second log message which requires a DLL associated with a hot fix of WINDOWS 2003. Log message collection system 200 may communicate with second host 115b to fetch the DLL associated with the hot fix and translate the second log message. Log message collection system 200 may then maintain the DLL associated with the hot fix to storage cache 225. In this way, log message collection system 200 ensures that a DLL necessary for translation of a log message may be fetched from host 115 of the log message, without loading thousands of DLLs or updating the DLLs.

Embodiments disclosed herein optimize the process of remote WINDOWS event collection. As a result, the startup time for a system is significantly reduced by immediately beginning collection on configured hosts. As opposed to prior art approaches that may take several hours to initialize, embodiments disclosed herein may start up in minutes. For large networks with many devices running different programs that may or may not have service packs or hot fixes, embodiments may reduce the time needed to begin processing log messages.

Another advantage is that cache storage and network bandwidth utilization may be reduced significantly. Practice has demonstrated that while each host 115 may have more than 1000 DLLs know to contain message translation information, only a small fraction of that number are needed to translate the events actually generated by host 115. If only 50 are needed, embodiments disclosed herein may retrieve only the 50, and cache storage 225 may be small. If each DLL is loaded only when needed, the bandwidth utilization may be reduced.

Another advantage is that new applications installed on hosts 115 may be handled automatically and transparently to the collection of events from that host 115. Once the new application generates the first set of events, embodiments may fetch the needed DLLs on-demand just as in the case of an infrequently generated system message.

In the foregoing specification, the disclosure has been described with reference to specific embodiments. However, one of ordinary skill in the art will appreciate that various modifications and changes can be made without departing from the spirit and scope of the disclosure disclosed herein. Accordingly, the specification and figures disclosed herein are to be regarded in an illustrative rather than a restrictive sense, and all such modifications are intended to be included within the scope of the disclosure.

What is claimed is:

1. A method for on-demand loading of message translation libraries, comprising the steps in order of:
    at a computer, receiving a log message into a log message collection system from a configured host communicatively coupled to the computer via a network connection and loading a predetermined subset of application Dynamic Link Libraries (DLLs) associated with the configured host and necessary for translating log messages from the configured host;
    wherein loading the predetermined subset of application DLLs comprises loading an updated subset of DLLs associated with the configured host;
    identifying a program that generated the log message and any hot fixes associated with the program;
    identifying a Dynamic Link Library (DLL) associated with a hot fix for the program and necessary for translating the log message;
    examining a cache to determine if the DLL is one of the predetermined subset of application DLLs and exists in the cache;
    if the DLL does not exist in the cache, fetching the DLL from the configured host; and
    translating the log message using the DLL.

2. The method of claim 1, wherein identifying a program that generated the log message comprises identifying any support packs associated with the program.

3. The method of claim 1, further comprising storing the DLL fetched from the configured host.

4. A device for on-demand loading of message translation libraries, the device comprising:
    a storage cache;
    a memory for storing a set of computer-executable instructions; and
    a processor operable to execute the set of computer-executable instructions to:
        upon startup, immediately fetch a log message from a log message host and load into the storage cache a predetermined subset of application Dynamic Link Libraries (DLLs) associated with the log message host and necessary for translating log messages from the log message host;
        update the predetermined subset of application DLLs and load the updated predetermined subset of application DLLs for the log message host upon startup;
        identify a program that generated the log message and any hot fixes associated with the program;
        determine if a Dynamic Link Library (DLL) associated with a hot fix for the program and necessary to translate the log message exists in the storage cache;
        if the DLL does not exist in the storage cache, fetch the DLL from the log message host;
        translate the message from the log message host; and
        store the fetched DLL in the storage cache.

5. The device of claim 4, wherein the processor is further operable to execute the set of computer-executable instructions to update the storage cache.

6. A log message collection system for on-demand loading of message translation libraries, the log message collection system comprising:
    a storage cache;
    a memory for storing a set of computer-executable instructions; and
    a processor operable to execute the set of computer-executable instructions to:
        receive a log message from a log message host;
        load a predetermined subset of application Dynamic Link Libraries (DLLs) associated with the log message host and necessary for translating log messages from the log message host upon startup;
        update the predetermined subset of application DLLs and load the updated predetermined subset of application DLLs for the log message host upon startup;
        identify a program that generated the log message and any hot fixes associated with the program;
        determine if a Dynamic Link Library (DLL) associated with a hot fix for the program and necessary to translate the log message exists in the storage cache;
        if the DLL does not exist in the storage cache, receive the DLL from the log message host;
        translate the message from the log message host utilizing the DLL; and
        store the DLL received from the log message host in the storage cache.

7. The log message collection system of claim 6, wherein the DLL is associated with a service pack.

8. The log message collection system of claim 6, wherein the log message collection system is further operable to update the storage cache.

9. A system for on-demand loading of message translation libraries, the system comprising:
    a plurality of hosts, wherein each host has an associated set of Dynamic Link Libraries (DLLs) for translating log messages generated by the host; and
    a log message collection system comprising:
        a storage cache;
        a memory for storing a set of computer-executable instructions; and
        a processor operable to execute the set of computer-executable instructions to:
            receive a log message from a log message host;
            load a predetermined subset of application Dynamic Link Libraries (DLLs) associated with the log message host and necessary for translating log messages from the log message host;
            update the predetermined subset of application DLLs and load the updated predetermined subset of application DLLs for the log message host upon startup;
            identify a program that generated the log message and any hot fixes associated with the program;

determine if a Dynamic Link Library (DLL) associated with a hot fix for the program and necessary to translate the log message exists in the storage cache;

if the DLL does not exist in the storage cache, fetch the DLL from the log message host;

translate the message from the log message host utilizing the DLL; and store the DLL fetched from the log message host in the storage cache.

10. The system of claim 9, wherein the processor is operable to execute the computer-executable instructions to:

identify a service pack that generated the log message;

examine the storage cache to determine if a DLL associated with the service pack and necessary to translate the log message exists in the storage cache; and if the DLL does not exist in the storage cache, fetch the DLL from the log message host.

11. The system of claim 9, wherein the log message collection system is further operable to update the storage cache.

* * * * *

UNITED STATES PATENT AND TRADEMARK OFFICE
CERTIFICATE OF CORRECTION

PATENT NO. : 8,578,393 B1  
APPLICATION NO. : 12/141209  
DATED : November 5, 2013  
INVENTOR(S) : Paul Fisher Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1414 days.

Signed and Sealed this
Third Day of March, 2015

Michelle K. Lee
*Deputy Director of the United States Patent and Trademark Office*